United States Patent [19]
Kasai et al.

[11] 3,963,830
[45] June 15, 1976

[54] THERMOLYSIS OF WATER IN CONTACT WITH ZEOLITE MASSES

[75] Inventors: Paul Haruo Kasai, White Plains; Roland Justin Bishop, Jr., Hauppage, both of N.Y.

[73] Assignee: Union Carbide Corporation, New York, N.Y.

[22] Filed: June 16, 1975

[21] Appl. No.: 587,387

[52] U.S. Cl.................................. 423/579; 423/657
[51] Int. Cl.².......................................... C01B 13/00
[58] Field of Search ............ 423/579, 648, 657, 658

[56] References Cited
UNITED STATES PATENTS

| | | | |
|---|---|---|---|
| 3,821,358 | 6/1974 | Interrante et al. | 423/579 |
| 3,839,550 | 10/1974 | Wentorf, Jr. | 423/579 |
| 3,842,164 | 10/1974 | Wentorf, Jr. | 423/579 |

*Primary Examiner*—Earl C. Thomas
*Attorney, Agent, or Firm*—Richard G. Miller

[57] ABSTRACT

Dehydration of hydrated crystalline zeolites containing trivalent metal cations results in the concurrent reduction of the trivalent cation to the bivalent state and the evolution of oxygen. Rehydration of the zeolite produces free hydrogen and oxidizes the bivalent metal cations to their initial trivalent state. A cyclic operation of the two procedures is advantageously employed.

6 Claims, 1 Drawing Figure

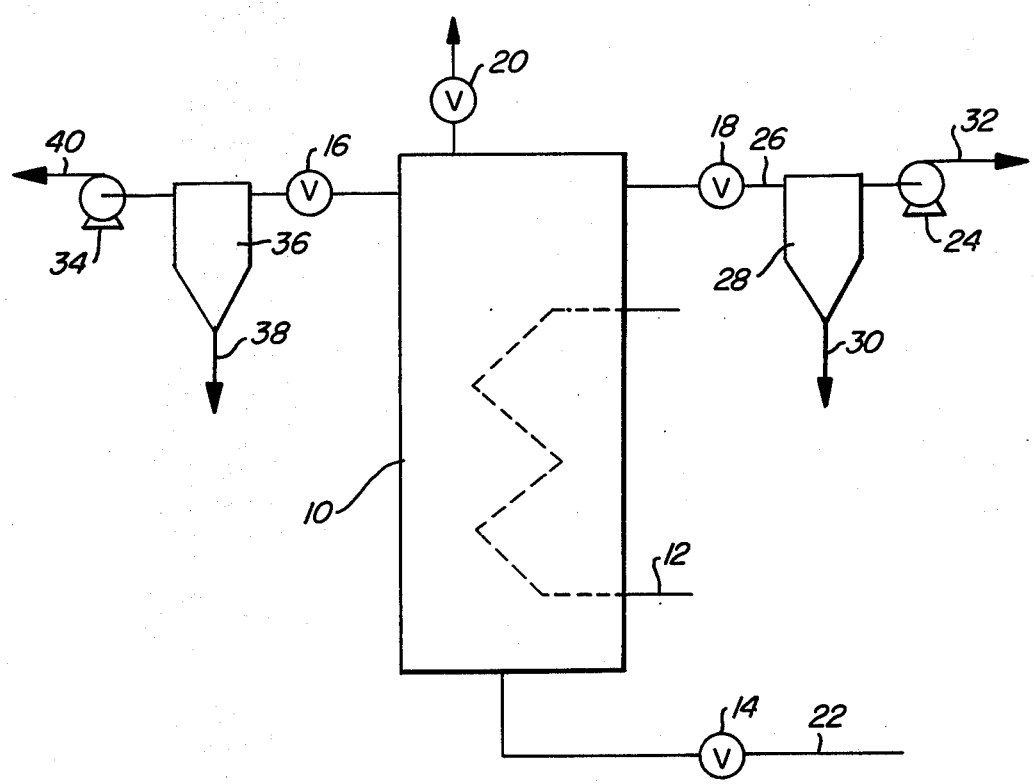

THERMOLYSIS OF WATER IN CONTACT WITH ZEOLITE MASSES

The present invention relates in general to the production of oxygen and hydrogen by a water thermolysis process employing certain metal aluminosilicates as chemical media to effect sequential rather than simultaneous evolution of the thermolysis products. More particularly it relates to the production and evolution of oxygen by an oxidation-reduction reaction in which water molecules are oxidized and trivalent metal cations of zeolitic molecular sieves are reduced. Subsequent oxidation of the metal cations to their original trivalent state by water molecules with the consequent reduction thereof produces free hydrogen which is evolved. In a particularly preferred embodiment a two-step closed-cycle for alternately producing oxygen and hydrogen on a continuous basis is attained by an appropriate combination of the aforesaid discreet processes.

BACKGROUND OF THE INVENTION

Closed-cycle thermochemical decomposition of water has for a long period of time been a subject of intensive investigation. There are thermodynamic limitations which have thwarted the development of a simple two-step process consisting of one heat absorbing, i.e. hot, step and one heat rejecting, i.e. cool, step. The minimum temperature difference in °C between the hot and cool steps ($T_{hot} - T_{cool}$) for any process which accomplishes reaction (1) is given by equation (2).

$$H_2O \rightarrow H_2 + \tfrac{1}{2} O_2 \qquad (1)$$

$$T_{hot} - T_{cool} = 58,000/\Delta S \qquad (2)$$

where 58,000 is the heat of formation of water in calories per mole, and $\Delta S$ is the standard entropy change of the process. The direct thermolysis of water, reaction (1), has entropy change, $\Delta S$, of only 40 entropy units (e.u.) and would require a minimum temperature swing of 1450°C, which is too large for practical processes at present. Real processes must be limited to smaller temperature swings, which would require an entropy change of 70 to 80 e.u., a value which has been considered impossible to achieve in one single reaction. All previously proposed processes for practical closed-cycle water thermolysis approach this problem by using a sequence of several reactions, apportioning the 70 to 80 e.u. total change among the multiple reaction steps. Many of these multireaction thermolysis schemes also involve highly corrosive chemicals, requiring special materials for construction. The present invention, however, comprises the discovery of a single reaction which does have the required large entropy change, and can therefore accomplish the thermolysis of water in a simple two-step process described above using practical temperature swings.

THE PRESENT INVENTION

The present invention comprises three discreet but inter-related aspects, namely the production of oxygen, the production of hydrogen and the cyclic process which alternates the production of oxygen and hydrogen. While we do not wish to be bound by any particular theory, it is believed that under the conditions imposed, certain trivalent metal cations in crystalline zeolite structures interact with water molecules whereby the trivalent cations are reduced and the water molecules are decomposed with the consequent evolution of oxygen. The evolution of hydrogen is attained by re-oxidizing the bivalent metal cations to their original trivalent state by imposing different operating conditions. Thus by manipulation of the process conditions the oxygen and hydrogen thermolysis products can be isolated from the reaction system separately, and a cyclic process established.

In the process embodiment in which oxygen is produced and evolved, the zeolite employed can be any three-dimensional crystalline zeolite of the molecular sieve type which has a pore diameter large enough to permit passage of the oxygen molecule, preferably at least 4 Angstrom units, and which contains, as non-framework structural members, trivalent metal cations having a standard electrode reduction potential more positive than −2.0, and preferably more positive than −1.0. By the term "non-framework structural members" is meant, both here in the specification and in the claims, cations which exist in the structure to balance the electrovalence of the $QO_4^-$ tetrahedra of the crystal lattic, wherein Q represents most commonly aluminum ions, but can also represent gallium. The term "standard electrode reduction potential" is used in its conventional sense. Reduction potential values are available in numerous standard reference publications, as for example, Handbook of Chemistry and Physics, 50th Ed. (1969–1970) pages D-109 et seq., Chemical Rubber Publishing Co. U.S.A. Techniques for determining reduction potential values are described in Latimer, W. M., the Oxidation States of the Elements and Their Potentials in Aqueous Solution, 2nd ed. Prentice Hall, New York, 1952. The preferred trivalent metal cations, i.e. those having reduction potentials more positive than −1.0 include europium, chromium and indium. Since trivalent metal cations are not ordinarily present in the zeolite structure, either in nature or in the as-synthesized form, the cation forms of zeolite used in the present process are readily prepared by the well known cation exchange procedures, either from aqueous or non-aqueous media, and also by dry diffusion.

Advantageously the zeolite reactant should be resistant to hydrothermal abuse which tends to deteriorate the crystalline structure and should contain a cation population having a high proportion of the reactive trivalent metal cation species. As a general proposition, the larger the $SiO_2/Al_2O_3$ molar ratio of crystalline zeolite the more hydrothermally stable it is. On the other hand, the higher the $SiO_2/Al_2O_3$ molar ratio, the lower the permissible number of metal cations, and accordingly some balance must be made between the number of active cation sites and the stability of the zeolite structure. Preferably the crystalline zeolite should have a $SiO_2/Al_2O_3$ molar ratio of at least 4.5, and have at least 50 per cent of its framework aluminum atoms associated with metal cations, of which at least 10 per cent are associated with trivalent metal cations.

The zeolite species include the minerals erionite, faujasite, clinoptilolite, mordenite, offretite, philipsite, chabazite, gmelinite and the synthetic species T, R, Y, Omega, L, ZSM-5, ZSM-8, ZSM-11 and ZSM-12. All of these zeolite species have been described in the patent literature.

In accordance with our theory, the thermolysis of a water molecule and the accompanying reduction of a trivalent metal cation, an evolution of oxygen occurs only after most of the water of hydration is removed from the zeolite, thereby eliminating or greatly lessening the stabilizing influence ordinarily exerted by absorbed water molecules on zeolitic cations. Thus when producing oxygen by the process of the present invention the most common mode of operation is to subject a zeolite containing an amount of water sufficient to stabilize the trivalent metal cations of the zeolite, said trivalent cations having a reduction potential more positive than −2.0 volts, to temperatures of from at least 200°C. preferably at least 400°C. up to the crystal destruction temperature of the zeolite and at accompanying pressure conditions to dehydrate the zeolite to the degree that residual water in the zeolite reduces the trivalent metal cations and evolves oxygen for collection. Dehydration, and hence oxygen evolution, is facilitated by increasing the temperature and lowering the vapor pressure of water over the zeolite mass. Since, however, the evolution of oxygen is much more readily determined than is the degree of dehydration, particularly at the threshold of total dehydration, any of an infinite number of combinations of temperature and pressure conditions are easily and routinely arrived at which will be suitable for the practice of the process with a particular zeolite using the evolution of oxygen as the indicia of success. Ordinarily pressures in the range of from essentially nil to 5 atmospheres will be employed.

It is found, however, that if there is free diffusion through the pore system of the zeolite by water molecules, and the dehydration is very rapidly accomplished, it is possible in some cases to dehydrate a zeolite starting material to the extent that there is not enough residual water to contact and react with the trivalent metal cations. In that event, the evolution of appreciable quantities of oxygen is accomplished by providing extraneous water to the reaction system in an amount sufficient to react with and reduce the trivalent metal cations but insufficient to stabilize those cations and thus prevent their necessary reduction. Accordingly, the oxygen-producing process of this invention generically comprises providing a crystalline zeolite having pores large enough to absorb oxygen and containing trivalent metal cations having a reduction potential more positive than −2.0 volts, said zeolite containing insufficient water of hydration to stabilize the said trivalent metal cations against reaction with water, and contacting said zeolite at a temperature of at least 200°C., preferably at least 400°C., up to the crystal destruction temperature of the zeolite with water molecules whereby the trivalent metal cations are reduced and oxygen is evolved, and collecting the evolved oxygen.

The reaction can be carried out either as a batch or continuous operation and using a static or dynamic system, provided only that means are provided to collect the gaseous oxygen reaction product as it is evolved from the reaction mass. Undesired water vapor, if present, is readily separated from the product oxygen mass by such well known and conventional techniques as condensation and desiccation.

In the process embodiment of this invention in which hydrogen is produced, the zeolite starting material employed can be any three-dimensional crystalline zeolite capable of absorbing water and which contains structural bivalent metal cations formed in situ by the reduction of trivalent metal cations which have a standard electrode reduction potential more negative than 0.0 and preferably more negative than −0.3 volts. It will be understood that in this specification and in the claims that the bivalent state of the metal cations involved is defined as being the valence state obtained by reducing the cation from its trivalent form by reaction with a water molecule or the corresponding state of reduction if other reducing agents are employed. It is also to be understood that such a zeolite composition must be substantially fully dehydrated in order for the said bivalent cations to exist. Advantageously the percursor trivalent cation form of the zeolite will conform to the specifications set forth hereinbefore concerning the starting material for the oxygen-producing process.

Hydrogen production is achieved by hydrating the zeolite starting material. The exact degree of hydration is not a critical factor. Quantities of water adsorbed on the zeolite of 5 percent of more of its full adsorptive capacity for water will result in hydrogen evolution and oxidation of the bivalent cations back to their usual trivalent state. The zeolite is considered to be totally free of water of hydration after the evolution of volatiles at 1000°C. Since the evolution of hydrogen is more easily detected and measured than is the degree of hydration of the zeolite, the optimum degree of hydration is routinely established for a particular zeolite composition and reaction system. For a given water vapor pressure over the zeolite mass, lowering the temperature increases the degree of hydration, and so also does increasing the water vapor pressure at a given temperature, as a general proposition. Temperatures of from 0°C. up to the decomposition temperature of the zeolite, and water vapor pressures of from 0.03 to 100 atmospheres are suitably employed. The process is carried out in any convenient apparatus which provides means for isolating the evolved hydrogen. Removal of water impurities from the product hydrogen is accomplished by known means of purification, i.e. desiccation.

The foregoing two processes can be combined in a manner that permits a two-step closed-cycle process wherein oxygen and hydrogen are alternately produced by the alternate reaction of water with the zeolite mass having trivalent and bivalent cations, respectively. In general, therefore, the cyclic process of the present invention comprises the steps of providing a closed reaction zone having means for admitting water vapor and withdrawing gaseous reaction products and water vapor therefrom and containing a hydrated three-dimensional crystalline zeolitic molecular sieve which has a pore diameter large enough to adsorb oxygen, said zeolite containing as non-framework structural members, trivalent metal cations having a standard electrode reduction potential of from 0.0 to −2.0, dehydrating said molecular sieve to a degree at least sufficient to convert said trivalent cations of said zeolite to bivalent metal cations whereby oxygen is produced and evolved, removing the oxygen evolved from the reaction zone, thereafter rehydrating said molecular sieve to a degree at least sufficient to oxidize the bivalent metal cations to their original trivalent state whereby hydrogen is evolved, and removing and recovering the hydrogen thus produced.

The drawings comprise a schematic flow diagram of a cyclic water thermolysis process utilizing a single reaction zone operating at different pressures and temperatures.

Examplification and illustration of all three process aspects of the present invention are set forth hereinafter with reference to the drawings. In the Schematic flow diagram reaction zone 10 contains 150 grams of mordenite which has been cation exchanged with hydrogen and chromic cations to the extent that its composition is

and contains 15 weight-% water of hydration. With valves 16 and 18 closed and valve 20 open, two-bed volumes of steam at 100°C. are passed through line 22 and valve 14 through bed 10 to flush air contained in the bed void space through valve 20 to the atmosphere. Thereafter the steam flow is terminated and valves 14 and 20 are closed. Heating element 12 is then activated and the temperature in the bed 10 is raised to 500°C. while the pressure therein is reduced by pump 24 through valve 18. Initially water vapor from the bed void space and water vapor desorbed from the zeolite mass passes through valve 18 and line 26 to condenser 28 wherein the bulk of the water is condensed in condenser 28 and removed through line 30. At the point where the zeolite is dehydrated to the extent that it contains less than 1 weight-% water of hydration oxygen is evolved and is removed through valve 18, line 26 by pump 24 and is collected via line 32. At the termination of the oxygen evolution, producing about 50 cc (stp) oxygen, heater 12 is deactivated and the bed allowed to cool to 100°C. while maintaining the pressure in the bed at one atmosphere by admitting steam through line 22 and valve 14. Thereafter valve 16 is opened and pump 34 is used to withdraw water vapor and evolved hydrogen from the bed. The bulk of the water vapor is condensed in condenser 36 and removed through line 38. The hydrogen product is collected via line 40.

What is claimed is:

1. Process for producing oxygen which comprises providing a closed reaction zone containing a three-dimensional crystalline zeolitic molecular sieve having pore diameters large enough to adsorb oxygen, said zeolite containing as non-framework structural members, trivalent metal cations having a standard electrode reduction potential more positive than −2.0, said molecular sieve containing insufficient water of hydration to stabilize the said trivalent metal cations against reaction with water, and contacting said zeolite at a temperature of at least 200°C. up to the crystal destruction temperature of the zeolite with water molecules whereby the trivalent metal cations are reduced and oxygen is evolved, and collecting the evolved oxygen.

2. Process according to claim 1 wherein the trivalent metal cations are reduced by reaction with water at a temperature of at least 400°C. up to the crystal destruction temperature of the zeolite.

3. Process according to claim 2 wherein the trivalent metal cations are europium, ytterbium, chromium or indium or mixtures thereof.

4. Process for producing hydrogen which comprises providing a closed reaction zone containing a dehydrated three-dimensional crystalline zeolitic molecular sieve having pore diameters large enough to adsorb water, said zeolite containing as structural constituents bivalent metal cations produced in situ by the reduction from their trivalent state, said trivalent cations having a standard reduction potential more negative than 0.0, contacting the said molecular sieve at a temperature of from 0°C. up to the crystal destruction temperature of the zeolite with water vapor at a water vapor pressure of from 0.03 to 100 atmospheres sufficient to hydrate said zeolite and evolve hydrogen, and thereafter withdrawing and recovering the hydrogen from said reaction zone.

5. Process according to claim 4 wherein the trivalent metal cations have a standard reduction potential more negative than −0.3.

6. The cyclic process for producing oxygen and hydrogen which comprises the steps of providing a closed reaction zone having means for admitting water vapor and withdrawing gaseous reaction products and water vapor therefrom and containing a hydrated three-dimensional crystalline zeolitic molecular sieve which has a pore diameter large enough to adsorb oxygen said zeolite containing as non-framework structural members, trivalent metal cations having a standard reduction potential of from 0.0 to −2.0, dehydrating said molecular sieve mass to a degree at least sufficient to convert said trivalent metal cations of said zeolite to bivalent metal cations whereby oxygen is produced and evolved, removing the oxygen evolved from the reaction zone, thereafter rehydrating said molecular sieve to a degree at least sufficient to oxidize the bivalent metal cations to their original trivalent state whereby hydrogen is evolved, and removing and recovering the hydrogen thus produced.

* * * * *